United States Patent [19]

Baldur

[11] Patent Number: 5,379,106
[45] Date of Patent: Jan. 3, 1995

[54] METHOD AND APPARATUS FOR MONITORING AND ADJUSTING THE POSITION OF AN ARTICLE UNDER OPTICAL OBSERVATION

[75] Inventor: Roman Baldur, Baie d'Urfe, Canada

[73] Assignee: Forensic Technology WAI, Inc., Montreal, Canada

[21] Appl. No.: 874,355

[22] Filed: Apr. 24, 1992

[51] Int. Cl.$^6$ ............................................. G01B 11/14
[52] U.S. Cl. .................... 356/375; 356/153; 356/394; 250/561; 359/385
[58] Field of Search ............ 356/375, 376, 394, 398, 356/372, 138, 141, 146, 150, 152, 153, 4, 5, 73; 358/101, 107, 106; 382/8, 22; 250/561, 560; 359/368, 385, 387, 389

[56] References Cited

U.S. PATENT DOCUMENTS

| | | | |
|---|---|---|---|
| 2,629,936 | 3/1953 | Cronstedt | 356/394 |
| 3,680,966 | 8/1972 | Cofek et al. | 356/241 |
| 4,105,925 | 8/1978 | Rossol et al. | 356/375 |
| 4,111,557 | 9/1978 | Rottenkolber et al. | 356/394 |
| 4,298,286 | 11/1981 | Maxey et al. | |
| 4,606,640 | 8/1986 | Hirst | 356/360 |
| 4,693,608 | 9/1987 | Kitagawa et al. | 356/394 |
| 4,893,932 | 1/1990 | Knollenberg | 356/369 |
| 5,076,697 | 12/1991 | Takagi et al. | 356/376 |

FOREIGN PATENT DOCUMENTS

| | | |
|---|---|---|
| WO8607443 | 12/1986 | Australia . |
| 0007227 | 1/1980 | European Pat. Off. . |
| 0197813 | 11/1984 | Japan ............ 356/375 |
| 0140903 | 6/1988 | Japan ............ 356/375 |

OTHER PUBLICATIONS

Patent Abstracts of Japan, vol. 9, No. 116 (P-357) (1839) 21 May 1985 & JP,A,60 003 502 (Toyota Jidosha K.K.).

Primary Examiner—Hoa Q. Pham
Attorney, Agent, or Firm—Fishman, Dionne & Cantor

[57] ABSTRACT

Planar light sources are directed at an article on either side of the optical axis so that the trace of each light beam defines a line, on either side of the optical axis, whose form is dependent on the shape of the surface of the article. To determine whether the article is in focus, the distance between the two lines is measured. To determine whether the article is in correct pitch, the distance between each line and the optical axis is measured and compared. To determine whether the article has drifted, the distances between the ends of the lines and the optical axis are measured and compared.

8 Claims, 8 Drawing Sheets

METHOD AND APPARATUS FOR MONITORING AND ADJUSTING THE POSITION OF AN ARTICLE UNDER OPTICAL OBSERVATION

BACKGROUND OF INVENTION

1. Field of the Invention

The invention relates to a method and apparatus for monitoring the position of an article under optical observation. More specifically, the invention relates to such a method and apparatus using laser means.

The invention also relates to such a method and apparatus which, in addition to monitoring the position of the article, also adjusts its position as required.

More specifically, the invention relates to a method and apparatus for monitoring the position of a bullet under optical observation for forensic purposes, and for adjusting the bullet as required, the method and apparatus using laser means.

2. Description of Prior Art

Various optoelectronic inspection systems are known in the art as illustrated in, for example, U.S. Pat. No. 3,680,966, Cofek et al, Aug. 1, 1972, U.S. Pat. No. 4,606,640, Hirst, Aug. 19, 1986, U.S. Pat. No. 4,893,932, Knollenberg, Jan. 16, 1990 and U.S. Pat. No. 5,076,697, Takagi et al, Dec. 31, 1991.

U.S. Pat. No. 3,680,966 teaches an optoelectronic inspection apparatus wherein light from a light source is directed by lens 12 through a source probe 14, and, via a system of mirrors 18 and 45 to a light detector 50. The system detects the area of aperture 32 in a shell casing 30. The light from the source 10 uninterrupted is fed to a light detector 12, and the output of light detectors 51 and 12 are directed through a system including a divider 70 and comparator 72 and 74, and the output is then fed to an indicator 84.

U.S. Pat. No. 4,606,640 teaches a system for optically testing the quality of reflective cylindrical surfaces. A monochromatic light (laser) beam 14 is directed at a diffraction grating 16 which is perpendicular to the direction of the beam. A wavefront 20 converges into line focus at 24 and then diverges as a cylindrical wavefront 26 to impinge on a test object such as a concave cylindrical surface 30. In FIG. 1, the cylindrical surface is concave. If the surface is convex (FIG. 2), then the surface is disposed ahead of the focal point 24.

In U.S. Pat. No. 4,893,932, differently polarized beams from lasers 16 and 14 (see FIG. 6) are directed to opposite sides of a monitoring area by a system of mirrors and lenses. The reflected light is directed, by a system of lenses, to a beam splitter 64 wherein the different polarized lights are directed to different inputs of a signal processor 76.

In U.S. Pat. No. 5,076,697, slit light projectors 3 direct their output on the surface of a circuit board 10 through galvano-mirrors 4. The image is then picked up by a television camera 1 and is processed in the image processor 7.

As can be seen, none of the references teach a system for monitoring and adjusting the position of an article under optoelectronic observation. Although the '932 patent does use two lasers, it uses them for an entirely different purpose. In addition, the laser beams of the '932 patent are not planar laser beams.

SUMMARY OF INVENTION

It is therefore an object of the invention to provide a method and apparatus for monitoring the position of an article under optical observation.

It is a more specific object of the invention to provide such a method and apparatus which not only monitors but also adjusts the position of the article.

It is an even more specific object of the invention to provide such a method and apparatus which uses laser means.

It is an even more specific object of the invention to provide such a method and apparatus for monitoring and adjusting the position of a bullet under optical observation for forensic purposes.

In accordance with a particular embodiment of the invention there is provided an apparatus for monitoring the position of an article, having a surface, under optical observation, said article being observed by an optical device having an optical axis, said article extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said apparatus comprising:
    at least one light source disposed to direct a planar light beam at said observation axis at a second point spaced from said first point so that said planar light beam impinges on the surface of said article at said second point;
    whereby, the trace of said light beam impinging on said article is a line whose form is dependent on the shape of said surface of said article.

In accordance with a further embodiment of the invention there is provided an apparatus for monitoring and adjusting the position of an article, having a surface, under optical observation, said article being observed by an optical device having an optical axis, said article extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said apparatus comprising:
    at least one light source disposed to direct a planar light beam at said observation axis at a second point spaced from said first point so that said planar light beam impinges on the surface of said article at said second point;
    whereby, the trace of said light beam impinging on said article is a line whose form is dependent on the shape of said surface of said article:
    and further including means for adjusting the position of said article.

In accordance with a still further embodiment of the invention there is provided an apparatus for monitoring the position of an article, having a surface, under optical observation, said article being observed by an optical device having an optical axis, said article extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said apparatus comprising:
a first light source disposed on one side of said optical axis and directing a first planar light beam at said observation axis at a second point spaced from said first point on said one side of said optical axis, and a second light source disposed on the other side of said optical axis and directing a second planar light beam at said observation axis at a third point spaced from said first point on said other side of said optical axis;
whereby, the trace of said first light beam impinging on said article comprises a first line, on said one side of said optical axis, whose form is dependent on the shape of said shape of said article, and the trace of said second light beam impinging on said article is a line, on the other side of said optical axis, whose form is dependent on the shape of said surface of said article.

In accordance with a still further embodiment of the invention there is provided an apparatus for monitoring and adjusting the position of an article, having a surface, under optical observation, said article being observed by an optical device having an optical axis, said article extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said apparatus comprising:
a first light source disposed on one side of said optical axis and directing a first planar light beam at said observation axis at a second point spaced from said first point on said one side of said optical axis, and a second light source disposed on the other side of said optical axis and directing a second planar light beam at said observation axis at a third point spaced from said first point on said other side of said optical axis;
whereby, the trace of said first light beam impinging on said article comprises a first line, said one side of said optical axis, whose form is dependent on the shape of said shape of said article, and the trace of said second light beam impinging on said article is a line, on the other side of said optical axis, whose form is dependent on the shape of said surface of said article;
and further including means for adjusting the position of said article.

From a different aspect, and in accordance with a particular embodiment of the invention, there is provided a method for monitoring the position of an article, having a surface, under optical observation, said article being observed by an optical device having an optical axis, said article extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said method comprising:
directing at least one planar light beam from a light source at said observation axis at a second point spaced from said first point;
whereby, the trace of said light beam impinging on the surface of said article is a line whose form is dependent on the shape of said surface of said article.

In accordance with a further particular embodiment of the invention of the second aspect there is provided a method for monitoring the position of an article, having a surface, under optical observations, said article being observed by an optical device having an optical axis, said article extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said method comprising:
directing a first planar light beam from a first light source disposed on one side of said optical axis at said observation axis at a second point spaced from said first point and directing a second planar light beam from a second light source at the other side of said optical axis at a third point spaced from said first point in said other side of said optical axis;
whereby, the trace of said first light beam impinging on said article comprises a first line, on said one side of said optical axis, whose form is dependent on the shape of said shape of said article, and the trace of said second light beam impinging on said article is a line, on the other side of said optical axis, whose form is dependent on the shape of aid surface of said article.

Planar beam, as herein used, means a beam having wide dimensions in one plane and very narrow dimensions in a transverse plane. An example of such a beam is a fan-shaped beam of very small depth.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
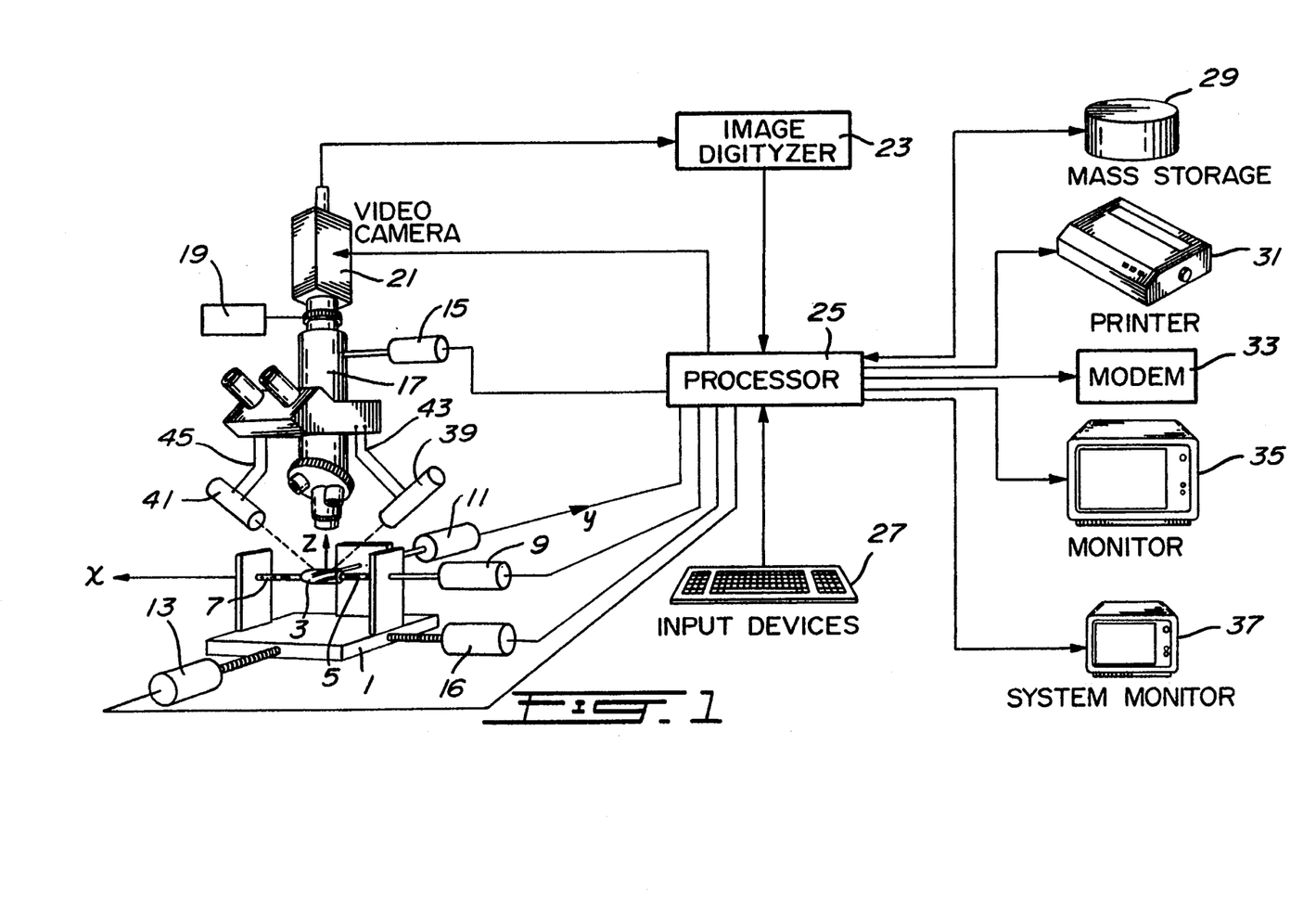
FIG. 1 is a somewhat perspective somewhat schematic view of an apparatus in accordance with the invention.

Referring now to FIG. 1, an apparatus in accordance with the invention includes a carrier 1 for movably mounting a bullet 3 for optical observation. Rods 5 and 7 extend from the carrier 1 to support the bullet 3.

As seen, the bullet extends longitudinally along an x-axis (observation axis) and at right angles to a z-axis (optical axis). At right angles to both the x-axis and z-axis is a y-axis (transverse axis).

A motor, illustrated schematically at 9, is provided for rotating the bullet about the x-axis whereby the entire peripheral surface of the bullet can be observed. Motor 11, also schematically illustrated, is provided for adjusting the pitch of the bullet by pivoting the bullet about the transverse axis. To adjust the focus, motor 15, which moves the microscope up and down along the z-axis, is activated. Obviously, motor 15 could be connected to move carrier 1 up and down the z-axis.

Motor 13, also schematically illustrated, is provided for moving the carrier 1, and the bullet 3, in the x-y plane defined by the x-axis and y-axis to compensate for drift. The terms "pitch", "focus" and "drift" as they apply herein will be more fully explained below.

Motor 16 moves carrier 1, and thereby bullet 3, along the observation axis 50 that different parts of the bullet can be observed.

The surface of bullet 3 is illuminated for image acquisition and is observed through a microscope 17.

The output of the video camera is fed to an image digitizer 23 to provide a digital signal representative of the image viewed by the video camera. The digital signal is then provided to processor 25 for processing.

As can be seen, the processor 25 is connected to the motors 9, 11, 13, 15 and 16. Thus, the processor can control the operation of the motors 11, 13 and 15 to adjust the position of the bullet dependent upon the information received from the image digitizer 23.

The apparatus will, as a matter of course, include an input device such as a keyboard 27, a data storage device such as a mass storage 29, an output device such as a printer 31, a transmission device such as a modem 33, a visual monitor for monitoring the output of the video camera such as a screen 35 and a monitor for monitoring the performance of the entire system comprising a screen 37.

Figure 2:
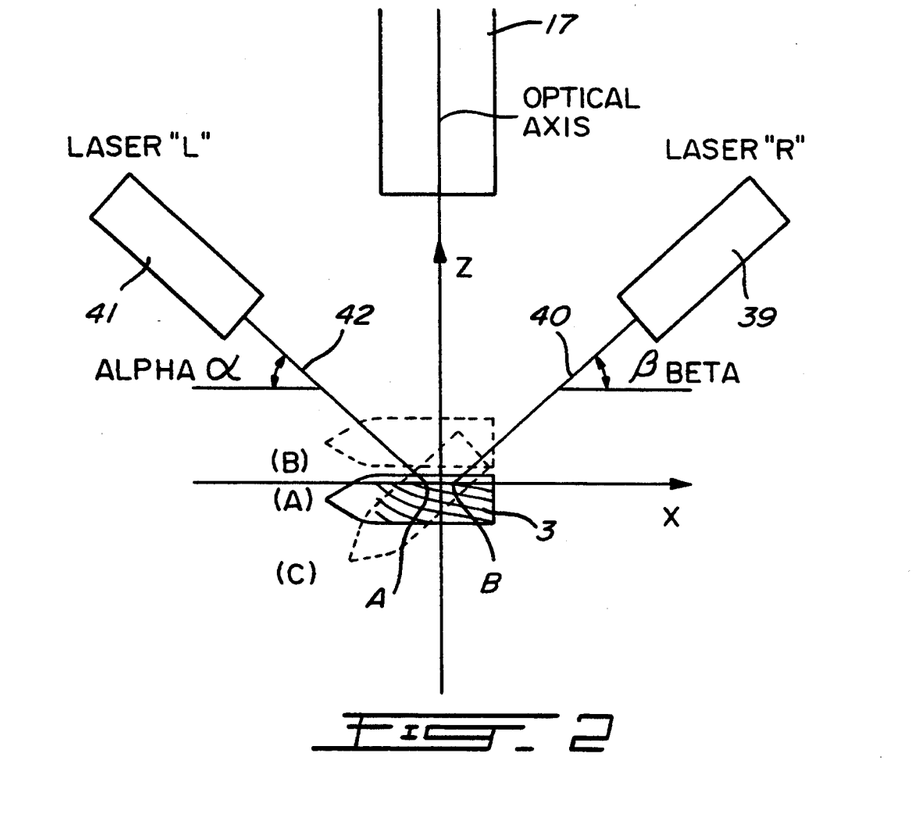
FIG. 2 illustrates the meaning of the terms focus and pitch as used herein.

Referring to FIG. 2, the bullet will be in focus when it is at the correct position from the microscope 17 along the z-axis. Thus, in FIG. 2, bullet 3 which is drawn in full lines is in focus, whereas the bullet which is parallel to the x-axis and drawn in dotted lines is out of focus.

"Pitch" is a term used to indicate the pivoting of the bullet 3 about the y-axis in the x-z plane defined by x-axis and z-axis. Preferably, the system is arranged to take images with zero pitch angle. Both the bullet in full lines and the bullet in dotted lines which are parallel to the x-axis are in correct pitch. The bullet shown in dotted lines at an angle to the x-axis has a pitch which must be corrected.

As also seen in FIG. 2, in a preferred embodiment, the light sources 39 and 41, which are preferably lasers, are disposed such that their central axes lie in the x-z plane. The light sources 39 and 41 are held by brackets 43 and 45 respectively. The laser 39 is at an angle $\beta$ to the x-axis while the laser 41 is at an angle $\alpha$ to the x-axis. Obviously, the lasers could be disposed at a plane which is at an angle to the x-z axis. Although preferably the angles $\alpha$ and $\beta$ are equal, it is possible that the lasers should be disposed at different angles. In a preferred embodiment, $\alpha$ and $\beta$ are 45°.

In accordance with the invention, the light sources 39 and 41 will emit beams 40 and 42 respectively which are planar beams as above defined. The planes of the beams 40 and 42 are perpendicular to the x-z plane.

Figure 4A:
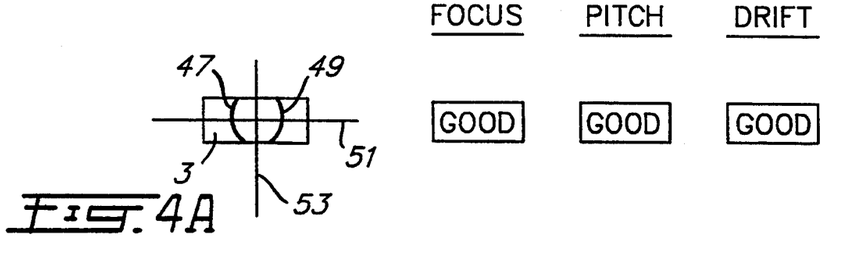
FIGS. 4A to 4E illustrate different conditions of the laser lines under different conditions of focus, pitch and drift of the bullet.

It will also be seen that the planar beam 42 intercepts the bullet 3 at a first point A on the x-z plane, while the planar beam 40 intercepts the bullet at a point B, also on the x-z plane, which is spaced from A. The lasers are adjusted in their brackets 43 and 45 so that A and B are symmetrically spaced about lateral center line 53 (see FIG. 4) and center line 51 (see FIG. 4). The distance between A and B, when the bullet surface is in focus, is used as a calibrated distance for focus adjustment.

Figure 3:
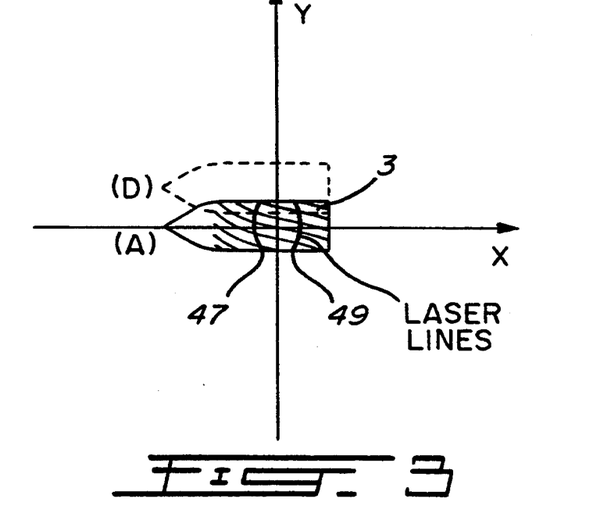
FIG. 3 illustrates the meaning of the term drift as used herein.

Turning now to FIG. 3, it will be seen that the traces 47 and 49 of the light beams on the bullet are elliptical when the bullet is cylindrical in shape. The particular form of the trace line, when the bullet is not cylindrical, will depend on the shape of the bullet surface (see, for example, FIGS. 6 and 7). The following description assumes a cylindrically-shaped bullet.

Turning now to FIG. 4, which illustrates different conditions as they apply to cylindrical bullets, the position of the bullet is monitored by determining the distance between the trace lines 47 and 49, the symmetry of the trace lines 47 and 49 about the lateral center line 53, and the symmetry of the trace lines 47 and 49 about the longitudinal center line 51. Thus, if the focus as shown in FIG. 4A is correct, then the focus as shown in FIG. 4B is incorrect. Specifically, in this case, the bullet is too close to the microscope.

Figure 4B:
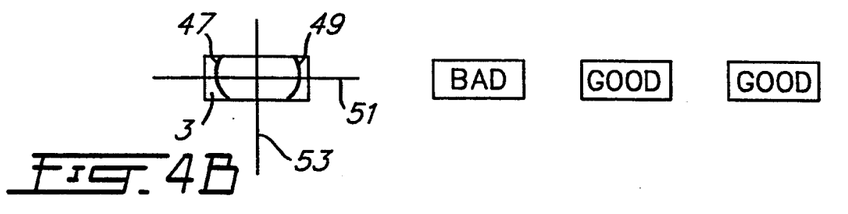
Figure 4C:
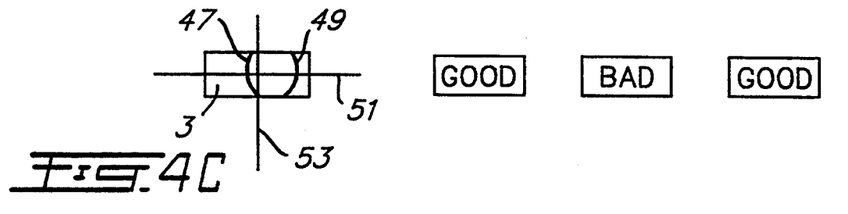

When the trace lines 47 and 49 are symmetrical about the lateral center line 53, as shown in FIGS. 4A and 4B, then the pitch is at a zero angle as required. When the trace lines 47 and 49 are not symmetrical about the lateral center line 53, as shown in FIG. 4C, then the pitch is not at zero so that the pitch angle has to be adjusted. In FIG. 4C, the nose of the bullet is tilted downward so that, to adjust the pitch, the nose either has to be tilted upwardly or the end of the bullet has to be tilted downwardly.

Figure 4D:
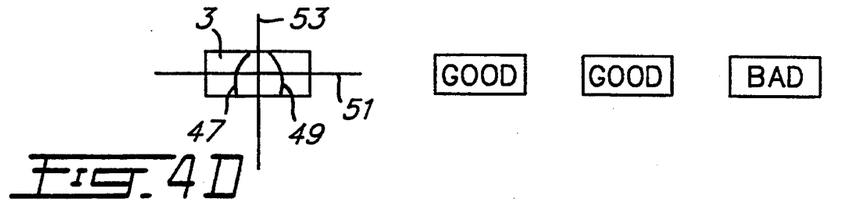

When the trace lines are symmetrical about the longitudinal center line 51, as shown in FIGS. 4A, 4B and 4C, then the drift is zero and the bullet is properly placed having regards to the drift. When they are not symmetrical, as shown in FIG. 4D, then the bullet has to be moved along the Y-axis, as shown in FIG. 1, by motor 11. In FIG. 4D, the bullet is in an incorrect position outwardly of the paper and has to be moved inwardly to correct its drift.

Figure 4E:
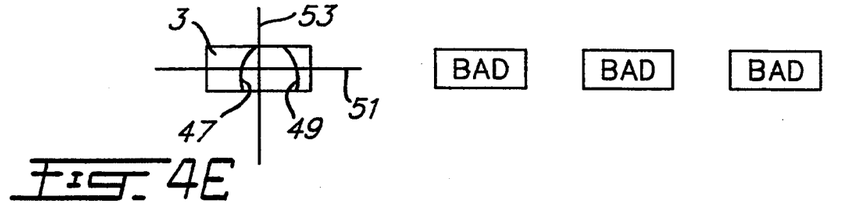

FIG. 4E shows a bullet which is improperly placed having regards to focus, pitch and drift.

Figure 5:
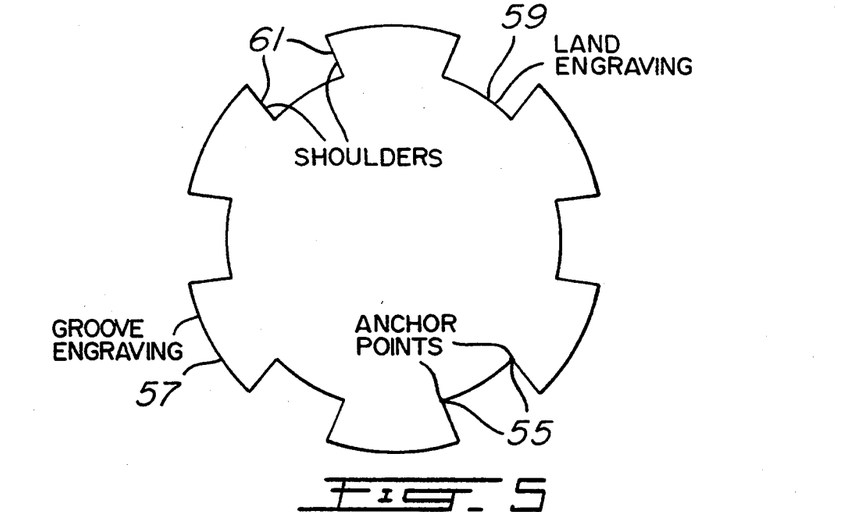
FIG. 5 illustrates how the "anchor points" on a bullet can be located using the invention.

The light sources 39 and 41 can also be used to locate the "anchor points" on the bullet. In this regard, the surface of a fired bullet has a series of circumferential depressions referred to as land engravings and illustrated in FIG. 5 at 59. The barrel of the gun through which the bullet was fired has a series of twisted grooves (rifling) machined on the inner surface of the gun barrel. As the bullet is propelled through the barrel, the internal shape of the barrel is engraved onto the bullet. The parts of the barrel which project toward the center are called "lands", and thus the depressions on the bullet are referred to as "land engravings" illustrated at 59 in FIG. 5. The land engraved areas contain most of the forensic information on a bullet and it is important to establish the limits of that engraved area referred to as the "anchor points" 55 shown in FIG. 5. Shoulders 61, which are sloping surfaces created during the passage of the bullet through the barrel, are located at the ends of groove engravings 57.

Figure 6:
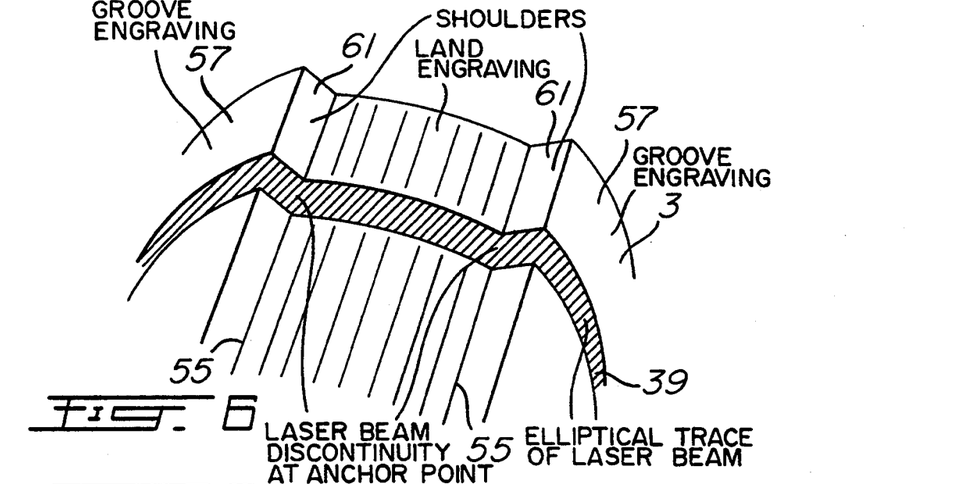
FIG. 6 shows a perspective view of the light traces over a land engraving of a bullet.
Figure 7:
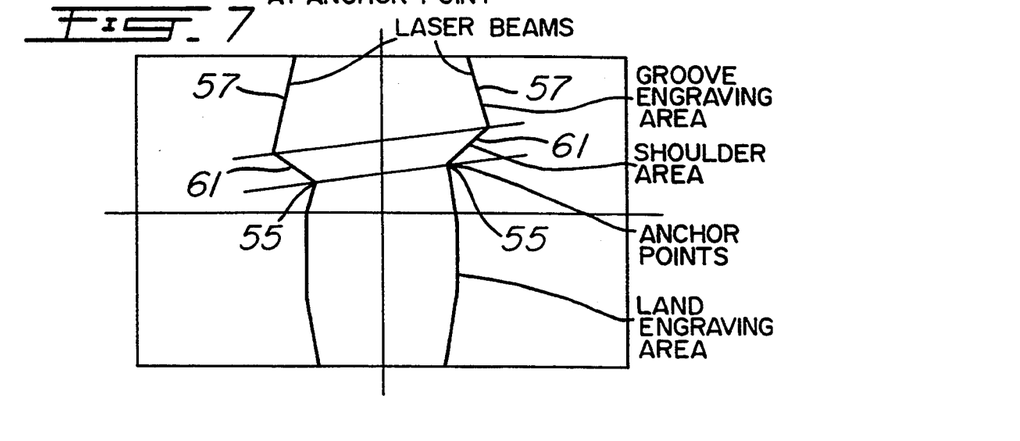
FIG. 7 is the view seen by the camera of the traces of FIG. 6.
Figure 8A:
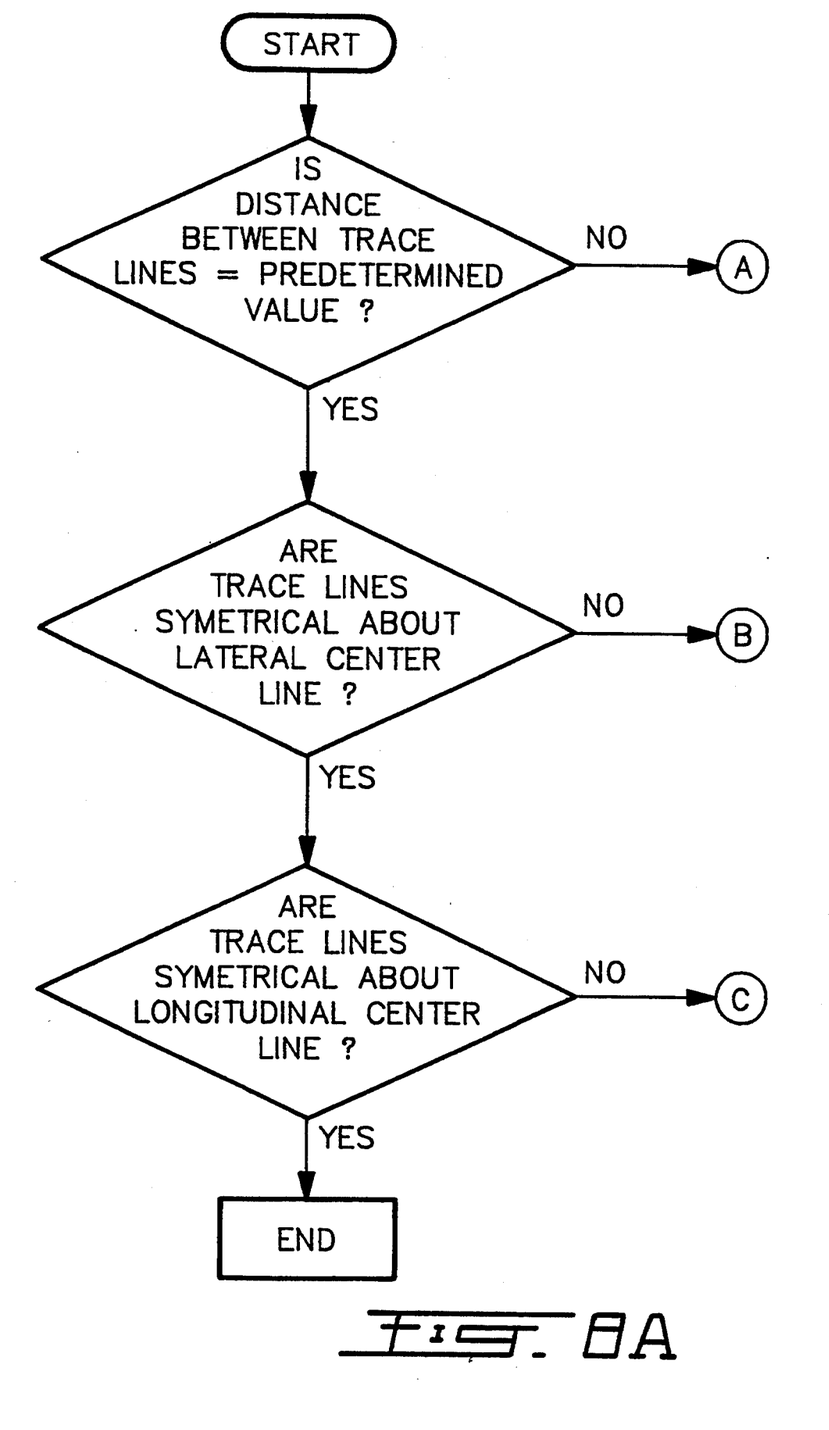
FIGS. 8A to 8D illustrate flow charts of a program for controlling the position of the cylindrical article.
Figure 8B:
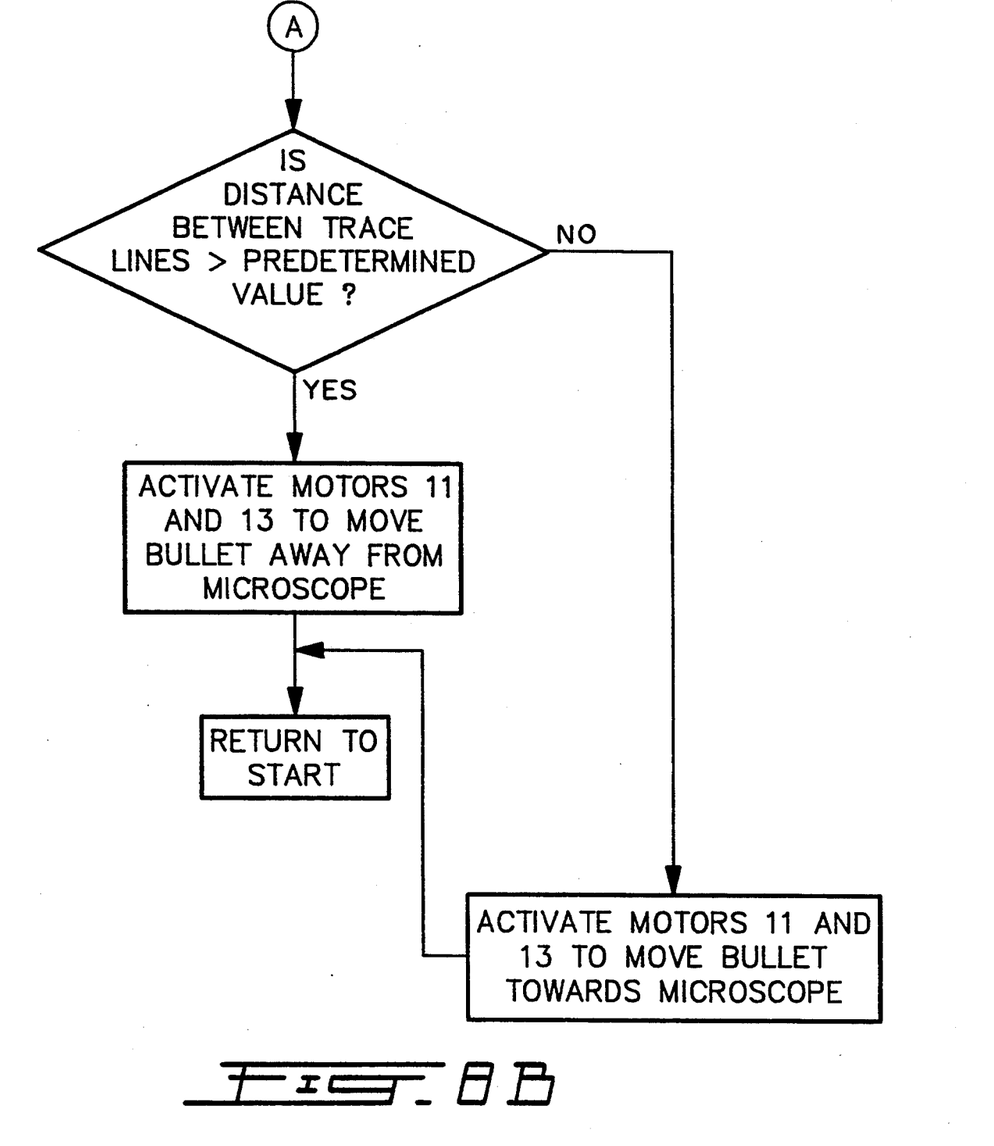
Figure 8C:
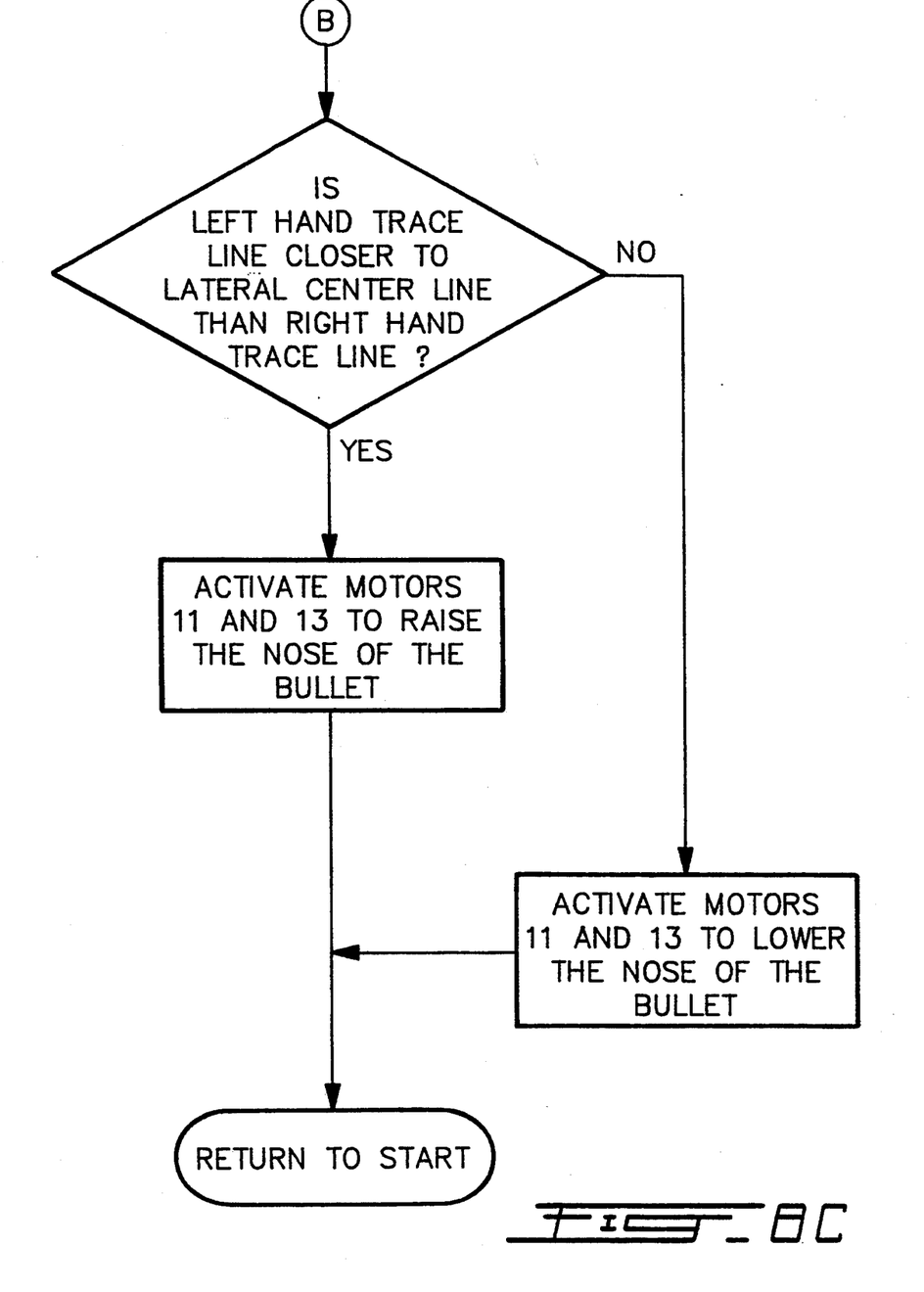
Figure 8D:
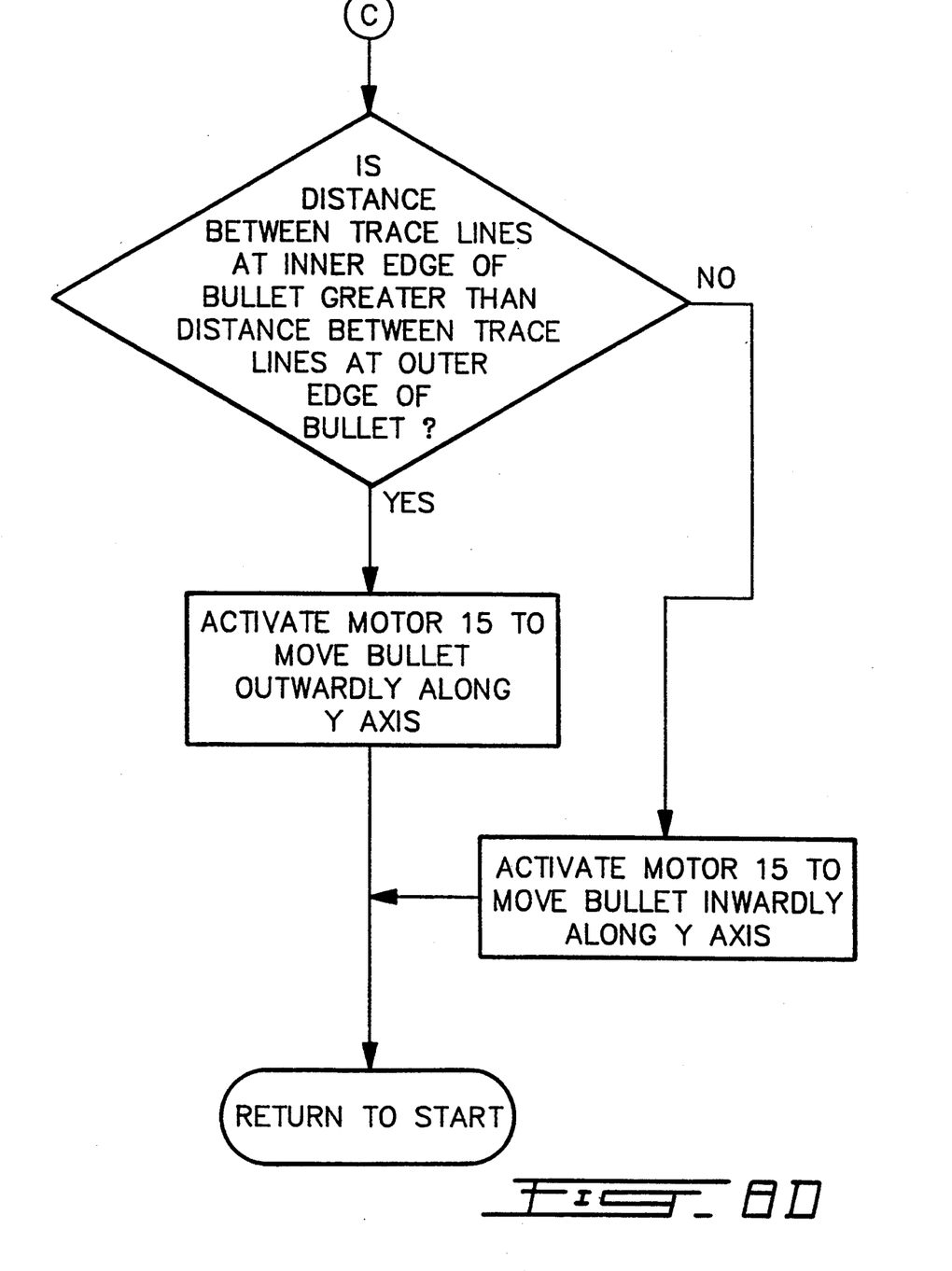

As seen in FIG. 6, the elliptical trace 39 is deformed by the shoulder 61. This deformation makes it possible to locate the anchor points as best seen in FIG. 7. Accordingly, the use of the monitoring apparatus and method in accordance with the invention permits the location of the important anchor points.

A flow chart for a computer program for monitoring and adjusting the position of the bullets is illustrated in FIG. 8. Obviously, the invention could be implemented in a manual fashion by providing manual adjustments instead of the motors 11, 13 and 15. Again, although the apparatus has been illustrated with two laser beams, the invention could be implemented with only a single beam. In the latter case, the distance between the single trace and the lateral center line would be measured and, if this does not correspond to a predetermined distance, then it would be known that the bullet is either out of focus or out of pitch or both. In order to determine if drift has to be compensated for, the distance from the top end of the trace to the lateral center line and the bottom end of the trace to the lateral center line would be measured and compared. If they are not equal, then the position of the bullet has to be corrected for drift.

Although several embodiments have been described, this was for the purpose of illustrating, but not limiting, the invention. Various modifications, which will come readily to the mind of one skilled in the art, are within the scope of the invention as defined in the appended claims.

I claim:

1. An apparatus for monitoring and adjusting the position of a bullet, having a surface, under optical observation, said bullet being observed by an optical device having an optical axis, said bullet extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said apparatus comprising:
a first light source disposed on one side of said optical axis and directing a first planar light beam at said observation axis at a second point spaced from said first point on said one side of said optical axis, and a second light source disposed on the other side of said optical axis and directing a second planar light beam at said observation axis at a third point spaced from said first point on said other side of said optical axis;

whereby, the trace of said first light beam impinging on said bullet comprises a first line, on said one side of said optical axis, whose form is dependent on the shape of said surface of said bullet, and the trace of said second light beam impinging on said bullet is a second line, on the other side of said optical axis, whose form is dependent on the shape of said surface of said bullet;

and further including means for adjusting the position of said bullet, whereby, to adjust the focus, drift and pitch of said bullet, said means for adjusting the position comprising;

a means for adjusting the focus comprising means for moving said bullet along said optical axis to thereby vary the distance between said bullet and said optical device;

a means for adjusting the drift comprising means for moving the bullet along said transverse axis; and a means for adjusting the pitch comprising means for pivoting said bullet about said transverse axis.

2. An apparatus as defined in claim 1 wherein said light sources comprise a laser beams.

3. An apparatus as defined in claim 2 wherein said optical device comprises a microscope.

4. An apparatus as defined in claim 3 wherein said means for adjusting comprises manual means.

5. An apparatus as defined in claim 3 wherein said means for adjusting comprises automatic means;
and further including a video camera connected to said microscope for recording the output of said microscope;

a processor connected to said video camera for processing the output of said video camera;

said automatic means comprising motors controlled by said processor.

6. An apparatus as defined in claim 2 wherein said light source is disposed in the plane formed by said observation axis and said optical axis.

7. A method for monitoring and adjusting the position of a bullet, having a surface, under optical observation, said bullet being observed by an optical device having an optical axis, said bullet extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said method comprising:
directing a first planar light beam from a first light source disposed on one side of said optical axis at said observation axis at a second point spaced from said first point and directing a second planar light beam from a second light source at the other side of said optical axis at a third point spaced from said first point in said other side of said optical axis;

whereby, the trace of said first light beam impinging on said bullet comprises a first line, on said one side of side optical axis, whose form is dependent on the shape of said surface of said bullet, and the trace of said second light beam impinging on said bullet is a line, on the other side of said axis, whose form is dependent on the shape of said surface of said bullet;

measuring various distances involving said first and second line whereby to determine the position of said bullet; and providing a means for adjusting the position of said bullet;

feeding said measurements to said means for adjusting whereby to drive said means for adjusting to alter the position of said bullet;

measuring the distance from each of said lines to said optical axis, and comparing said measured distances, whereby to determine whether the bullet is in correct pitch;

and further including the step of pivoting said bullet about said transverse axis to correct the pitch when the pitch is incorrect.

8. A method for monitoring and adjusting the position of a bullet, having a surface, under optical observation, said bullet being observed by an optical device having an optical axis, said bullet extending generally in the direction of an observation axis, said observation axis extending at right angles to said optical axis, said optical axis intercepting said observation axis at a first point, a transverse axis extending at right angles to both said optical axis and said observation axis and intercepting said optical axis and said observation axis at said first point;

said method comprising:
directing a first planar light beam from a first light source disposed on one side of said optical axis at said observation axis at a second point spaced from said first point and directing a second planar light beam from a second light source at the other side of said optical axis at a third point spaced from said first point in said other side of said optical axis;
whereby, the trace of said first light beam impinging on said bullet comprises a first line, on said one side of said optical axis, whose form is dependent on the shape of said surface of said bullet, and the trace of said second light beam impinging on said bullet is a line, on the other side of said optical axis, whose form is dependent on the shape of said surface of said bullet;
measuring various distances involving said first and second line whereby to determine the position of said bullet; and
providing a means for adjusting the position of said bullet;
feeding said measurements to said means for adjusting whereby to drive said means for adjusting to alter the position of said bullet;
measuring the distance from the top end of said lines to said optical axis and the bottom ends of said lines to said optical axis and comparing these measured distances to determine if the bullet has drifted;
and further including the step of moving said bullet along said transverse axis to correct the drift if the drift is incorrect.

* * * * *